United States Patent [19]

Shoji et al.

[11] Patent Number: 4,641,200
[45] Date of Patent: Feb. 3, 1987

[54] IMAGE REPRODUCING APPARATUS WITH VARIABLE AC BIAS

[75] Inventors: Hisashi Shoji; Satoshi Haneda; Seiichiro Hiratsuka, all of Hachioji, Japan

[73] Assignee: Konishiroku Photo Industry Co., Ltd., Tokyo, Japan

[21] Appl. No.: 699,416

[22] Filed: Feb. 7, 1985

[30] Foreign Application Priority Data

Feb. 10, 1984 [JP] Japan ................... 59-22018
Mar. 15, 1984 [JP] Japan ................... 59-48245
Mar. 15, 1984 [JP] Japan ................... 59-48246

[51] Int. Cl.$^4$ ............ H04N 1/21; H04N 1/23; H04N 1/29; G03G 15/00
[52] U.S. Cl. .................... 358/296; 358/298; 358/300; 355/3 R
[58] Field of Search ............ 358/296, 298, 300, 301; 355/3 R

[56] References Cited

U.S. PATENT DOCUMENTS

| 3,964,388 | 6/1976 | Maxwell | 358/300 X |
| 4,042,962 | 8/1977 | Yamaji et al. | 358/300 X |
| 4,294,534 | 10/1981 | Snelling | 358/300 X |
| 4,296,423 | 10/1981 | Nakamura | 355/3 R X |
| 4,398,816 | 8/1983 | Nakajima et al. | 355/3 R |
| 4,408,871 | 10/1983 | Kojima | 358/300 X |

Primary Examiner—E. A. Goldberg
Assistant Examiner—Patrick W. Foster
Attorney, Agent, or Firm—James E. Nilles; Thomas F. Kirby

[57] ABSTRACT

An image reproducing apparatus wherein latent images are formed on an image retainer by a plurality of latent image forming device and the latent images are developed by developing means to which a developing bias is applied. The developing bias can be applied in accordance with the difference of the latent image forming device. One of the latent image forming device is a continuous tone latent image forming device and the other is a dispersed tone latent image forming device.

15 Claims, 15 Drawing Figures

IMAGE REPRODUCING APPARATUS WITH VARIABLE AC BIAS

BACKGROUND OF THE INVENTION

1. Field of the Invention

This invention relates to an image reproducing apparatus which subjects image information to signal processing of a predetermined system to obtain image signals, then forms a latent image on an image retainer on the basis of the image signals and obtains an image composed of dots by depositing a toner on the latent image in an electric field. More particularly, the present invention relates to an image reproducing apparatus of the type described above which can reproduce an image under conditions suitable for the kind of images to be reproduced.

The present invention relates also to an image reproducing apparatus which develops a latent image formed by different latent image formation means on an image retainer, using developing means in an electric field.

2. Description of the Prior Art

An electrophotographic reproducing apparatus using a laser as an exposure light source such as shown in FIG. 1 has been known in the past.

This reproducing apparatus operates in the following manner. A signal applied from an original camera element or other appliance or an image data I obtained from a data memory or the like is processed by a signal processing device 1 to obtain an image signal (hereinafter referred to as a "binary image") constituted by picture element data that has been converted to binary data (that is, black and white data). A laser write-in device 2 consisting of laser, a sound-optical modulator, lenses, a rotary polygon mirror and the like is then subjected to ON-OFF control for each picture element by the picture element data of this binary image, in order to expose the image by a laser spot on the surface of a photosensitive drum 3 which is uniformly charged electrically by a charger 4 and rotates in a direction represented by an arrow. A toner is then deposited on the resulting latent image by a developing device 5 the details of which are shown in FIG. 2, in an electric field, and the resulting toner image is transferred to a recording paper P that is being fed in such a fashion as to come into contact with the surface of the photosensitive drum 3 in synchronism with the revolution of the drum 3, by transfer means 6. The transfer paper P on which the toner image has been thus transferred is separated from the surface of the photosensitive drum 3 by separation means 7, and the toner image is then fixed by a fixing device 8. The recording paper P is discharged from the reproducing apparatus, and the surface of the photosensitive drum 3 after the transfer of the toner image is cleaned by charge eliminating means 9 to remove the charge. The remaining toner is then removed by a cleaning device 10, thereby completing one image reproducing process.

Next, the developing device shown in FIG. 2 will be explained. Reference numeral 51 represents a developing sleeve made of a non-magnetic material such as aluminum, stainless steel or the like. When a bias voltage is applied to the sleeve from a bias power source 11, an electric field is generated in a developing zone A between the sleeve 51 and the photosensitive drum 3 which has its base portion grounded. A magnet 52 having a plurality of N and S poles is disposed inside, and on the surface of, the developing sleeve 51. When the developing sleeve 51 is stationary or rotates leftward and the magnet 52 rotates rightward or is stationary, respectively, the developer that has been attracted from a developer bin 53 to the surface of the developing sleeve 51 by the magnetic force of the magnet 52 moves counter-clockwise when one or both of these members rotate. The quantity of the developer thus conveyed is controlled by a layer thickness limit blade 54, and a developer layer having a uniform thickness is formed. This developer layer develops the latent image on the photosensitive drum 3 in the developing zone A in which the electric field is generated by the bias voltage. The remaining developer layer after leaving the developing zone A is removed from the surface of the developing sleeve 51 by a cleaning blade 55 and is sent back to the developer bin 53. The developer in the developer bin 53 is agitated by agitation blades 56 and is uniformly mixed with the toner that has been supplied from a toner hopper 57 by a toner supply roller 58.

The signal processing system in the signal processing device 1 in the conventional image reproducing apparatus described above is such that each picture element of the image data I having a multilevel or continuous tone is compared with a threshold value that has been set in advance, in order to convert the image data I to the binary image. This processing system can be classified into a method which sets the same threshold value for all the picture elements (hereinafter called the "pure binary method") and a method which has a different threshold value depending upon each picture element (hereinafter called the "dither method"). The pure binary method is effective for reproducing an image such as a line or a character for which high resolution is fundamentally necessary.

However, when an image such as a photograph for which tone is a requisite is converted to a binary image, a false profile manifests itself and smoothness is lost. On the other hand, the dither method can reproduce artificially the intermediate tone by means of the density of spatial distribution of black dots and hence is effective for processing images such as photographs. However, resolution is reduced.

This point will be described with reference to FIG. 3.

FIG. 3 illustrates the principle of binary conversion of the image data I in the signal processing device 1. The drawing shows the case where a systematic dither method is employed as an example of the dither method. Symbol I1 represents input image data representing the density level of the picture element at 16 stages, R1 is a predetermined threshold matrix, and S1 is output image data which compares the picture element of the input image data I1 with the corresponding threshold value of the threshold matrix R1 and produces a logic "0" or logic "1" depending upon whether the density level of the picture element is above or below the threshold value. The tone can be artificially represented by the distribution of "0" and "1" in the output image data S1 with "0" and "1" representing white and black, respectively, but resolution is obviously less. A binary image having high reproducibility of tone can be obtained by other suitable dither methods besides the systematic dither method shown in FIG. 3, such as a system which sets at random the threshold values "1–16" for each picture element or a system which sets the threshold value for a particular picture element from adjacent picture element data. In comparison with these other systems, the systematic dither method has a higher calculation speed and provides higher reproducibility of intermediate tone.

In comparison with the dither method described above, when the input image data I1 is converted to binary values of "0" or "1" with the threshold value being at "9", for example, in accordance with the pure binary method, the arrangement of "10" in the input image data I1 proves as such to be the black picture element of "1", and the tone can not be represented smoothly with that distribution. Conversely, resolution of the input image data I1 can be maintained.

It can not be said generally that the dither method is more advantageously used in the case where the input image data I has virtually been converted to binary values such as a screen image and the intermediate tone has been artificially reproduced, because moiré is likely to occur due to the spatial frequency of dots and the spatial frequency of the dither pattern. It is more advantageous from time to time to process a screen image by the pure binary method.

As described above, an excellent reproduced image can be obtained by forming a binary image in accordance with an appropriate signal processing system depending upon the kind of input image data I. For example, the pure binary method is suitable for line images and screen images, while the dither method is suitable for tonal images.

However, the conventional image reproducing apparatus has converted the image data I to a binary image with the same signal processing system regardless of the kind of images.

In the conventional image reproducing apparatus, the laser write-in device 2 exposes the image with a laser spot having the same diameter regardless of the kind of images to be reproduced, and the resulting electrostatic latent image is developed under an electric field generated by the bias voltage under the same conditions unless specifically changed so as to be otherwise. As a result, the reproduced image consists always of dots of the same size.

This point will be described in further detail with reference to FIG. 4.

FIGS. 4(a), 4(b) and 4(c) illustrate the reproduced image in magnification, and schematically depicts the case where the dot diameter is greater with respect to the gaps between dots (represented by circles) in the order of FIGS. 4(a), 4(b) and 4(c). Generally, high resolution and sharpness are required for line images expressing characters and line images, and in order to satisfy this requirement, the gaps between the dots such as shown in FIG. 4(a) and concavo-convexity such as shown in FIG. 4(b) must not be remarkable. In other words, it is necessary for a line image that the dots continue and overlap one another to form an image such as shown in FIG. 4(c). In the case of the tonal image such as a photograph for which the reproducibility of intermediate tone and smoothness are important, the dots must artificially reproduce the intermediate tone, and to accomplish this object, the spatial frequency must be high, that is, the dots must be arranged in such a fashion that they do not cluster at one position, as described already. The tone of the original image can be easily reproduced if the dots are arranged in such a fashion that they do not overlap one another and the number of dots is proportional to the area to be colored. This means that if the original image is a tonal image consisting of a continuous tone or dots, the arrangement such as shown in FIG. 4(b) in which the dots do not overlap one another or the arrangement such as shown in FIG. 4(a) in which the dots are discontinuous is preferably employed.

The conventional image reproducing apparatus neglects this important point, but reproduces the image by dots of a predetermined size, regardless of the kind of images, as described already. Therefore, it has been extremely difficult to obtain both excellent line images and excellent tonal images.

A image reproducing apparatus has also been known to this data which is equipped with a slit exposure device and a laser spot exposure device, and which develops an electrostatic latent image formed by these devices on the surface of a photo-sensitive member of an image retainer using the same developing means to which the same bias voltage is applied. The image reproducing apparatus satisfies the function of a copying machine using a slit exposure device and the function of a printer using a laser spot exposure device, and moreover, it can reproduce a composite image by superposing a toner image by the use of the slit exposure device on the image retainer with a toner image by the use of the laser spot exposure device. If two different color toners are used for the developing means in this case, the image reproducing apparatus can change the color of the image formed by the slit exposure device from the color of the image formed by the laser spot exposure device.

Analog latent image forming means such as a slit exposure device which projects the image of an original as such on the surface of the image retainer forms, in principle, an electrostatic latent image of a continuous tone, hence it is necessary that development of such a latent image can well reproduce a continuous tone. On the other hand, digital latent image forming means such as a laser spot exposure device which is driven by digital electric signals or the like and radiates the spot exposure light to the surface of the image retainer generally forms a latent image of a dot composition having dispersed tone including binary tone, hence it is necessary that development of the latent image can develop the dots in a high density, but reproducibility of the intermediate tone is not generally required. This means that the conditions required for the image quality vary depending upon the kind of tone of the latent images such as a continuous tone or a dispersed tone, and the condition of development or the developing characteristics must change accordingly.

As described above, however, the conventional image reproducing apparatus effects development under the same developing condition even when the kind of latent image is different. When reproduction is made with high tone, development of the latent image formed by digital means involves the problem that the dots become so small that the degree of breakage of lines and steps is unacceptable and image density is inadequate. When a sharp line image is also to be obtained from the latent image formed by digital means by improving the image density, a problem occurs in that development of the latent image that is formed by analog means exhibits low tone and provides a hard impression. Thus, it has by no means been easy to develop latent images under conditions suitable for each kind of latent image.

SUMMARY OF THE INVENTION

In order to eliminate the problems of the prior art described above, the present invention is directed to provide an image reproducing apparatus which can always provide an excellent reproduced image having high resolution, sharpness, intermediate tone, smoothness and the like in accordance with the kind of image to be reproduced.

It is another object of the present invention to eliminate the problems encountered in an image reproducing apparatus of the type described above which forms different kinds of latent images. In other words, the present invention is directed to provide an image reproducing apparatus which can develop a latent image with excellent tone for a latent image of a continuous tone and which can develop a latent image with high contrast for a latent image of a dispersed tone, hence can fully exhibit the respective characterising features of latent images in accordance with their kind.

In an image reproducing apparatus of the type which forms a latent image on the basis of image signals, deposits a toner onto the latent image under an electric field and obtains an image of a dot construction, the gist of the present invention resides in an image reproducing apparatus which changes over the electric field in accordance with the kind of images to be reproduced, and this construction can accomplish the objects of the invention described above.

In an image reproducing apparatus of the type which subjects image information to signal processing of a predetermined system to obtain image signals, forms a latent image on an image retainer on the basis of the image signals and deposits a toner onto the latent image in an electric field to obtain an image of a dot composition, the gist of the present invention resides also in an image reproducing apparatus which can change the size of dots constituting the image in accordance with the kind of images to be reproduced, and this construction can accomplish the objects of the invention described above.

In an image reproducing apparatus which develops latent images formed on the surface of an image retainer by different latent image forming means in a biased electric field (developing bias), the gist of the present invention resides also in an image reproducing apparatus which can change the a.c. component of the biased electric field in accordance with the difference of the latent image forming means, and this construction can accomplish the objects of the invention described above.

Other objects and features of the present invention will be described below in detail in conjunction with the drawings.

DESCRIPTION OF THE PREFERRED EMBODIMENTS

First of all, the fundamental principle of the present invention will be described with reference to FIGS. 5 and 6.

Figure 2:
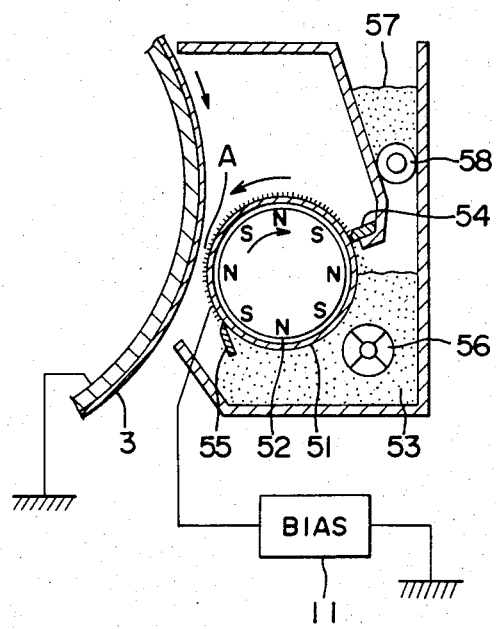
FIG. 2 is a partial view showing a typical developing device.
Figures 4A, 4B, 4C:
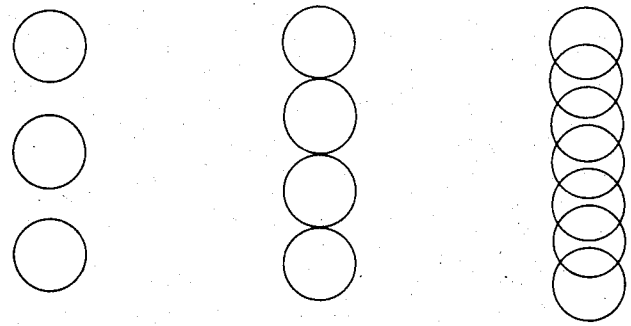
FIGS. 4(a), 4(b) and 4(c) are partially enlarged plan views showing a reproduced image, respectively.
Figure 3:
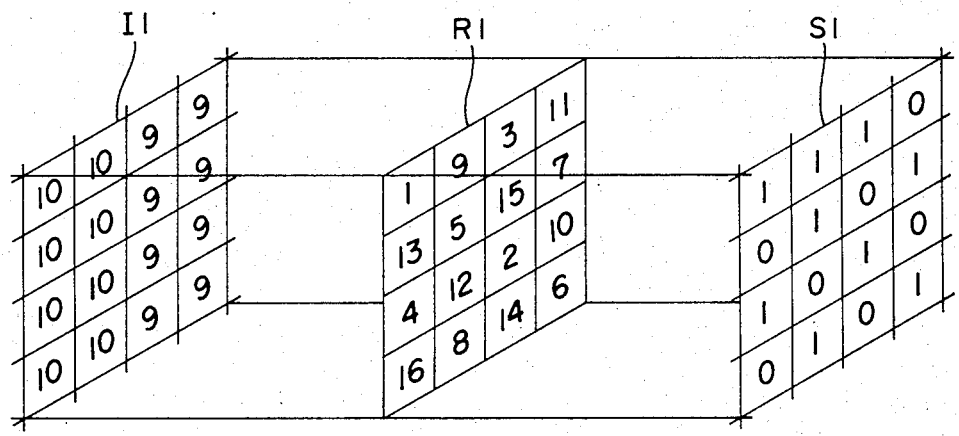
FIG. 3 is a diagram useful for explaining the principle of binary conversion of image data.
Figure 5:
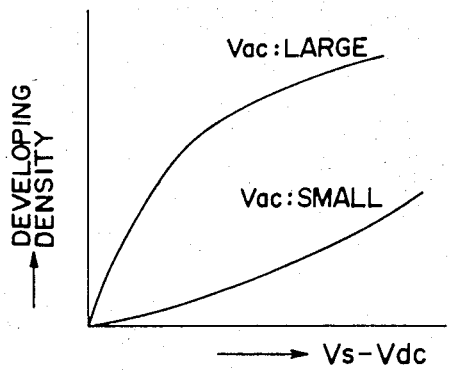
FIGS. 5 and 6 are diagrams showing the mode of change of developing characteristics when the amplitude and frequency of an a.c. bias are changed, respectively.
Figure 6:
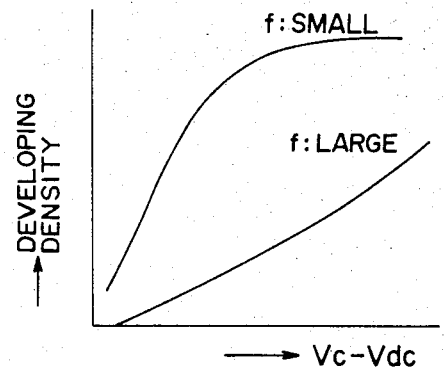

FIGS. 5 and 6 show the change of the developing characteristics with respect to the amplitude $V_{ac}$ and frequency of the a.c. component, that is, with respect to the reciprocal of the period, in a bias voltage which has an a.c. component and a d.c. component and which is applied to the developing sleeve 51 by the bias power source 11 when the toner image is formed on the photosensitive drum 3 using the developing device shown in FIG. 2. In the drawings, $V_s$ represents the surface potential of the photosensitive drum 3, and $V_{dc}$ represents the d.c. component of the bias voltage.

As can be clearly seen from FIGS. 5 and 6, the greater the amplitude $V_{ac}$ of the a.c. bias and the smaller the frequency f, that is, the greater the period, the higher the image density. The dot diameter tends to increase under conditions which provide a higher image density. That is, if one, or both, of the amplitude $V_{ac}$ and period of the a.c. component of the bias voltage are great, the diameter of the reproduced dots is great, and when the former is small, the latter becomes small.

The image reproducing apparatus of the present invention utilizes the principle described above.

Figure 1:
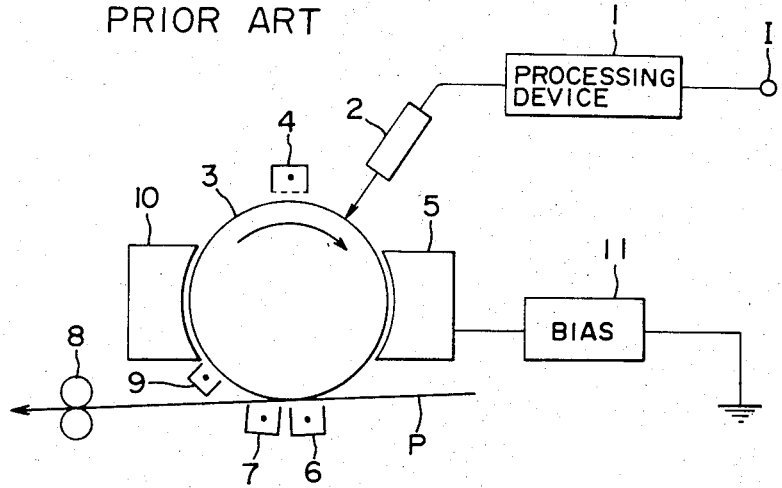
FIG. 1 is a schematic view showing the construction of a typical conventional electrophotographic reproducing apparatus of a laser write-in system.
Figure 7:
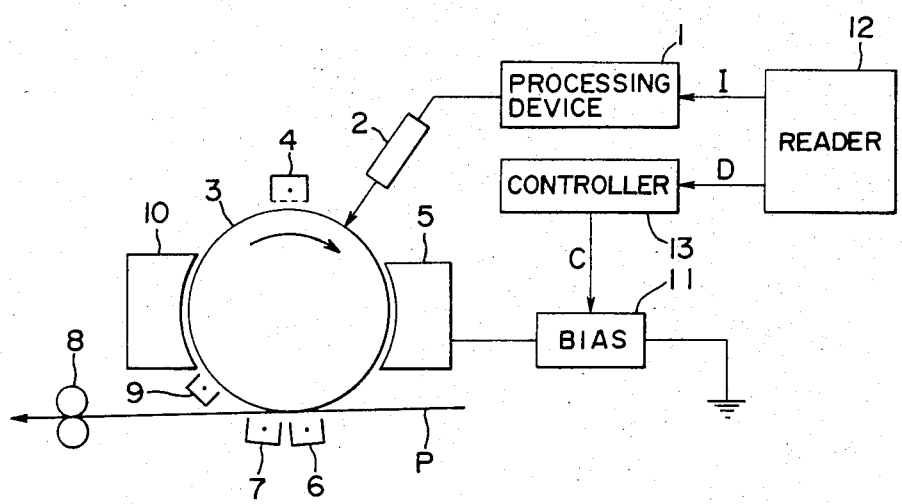
FIGS. 7 and 8 are schematic views showing the construction of an image reproducing apparatus in accordance with one embodiment of the invention.

FIG. 7 shows an example of the image reproducing apparatus of the present invention, and the same reference numeral with that of FIG. 1 represents the member having the same function.

In the reproducing apparatus shown in FIG. 7, an image reader 12 reads the original with a CCD camera element and produces the image data I to the signal processing device 1, and at the same time or before this operation, it produces a discrimination signal D to a controller 13 as the control portion of the reproducing apparatus. This discrimination signal D represents whether the image data I, that is judged by an operator of the apparatus or by the image reader 12, is a line image or a tonal image. The controller 13 then produces a control signal C to the basis power source 11.

The signal processing device 1 converts the image data I to a binary image and applies it to the laser write-in device 2. The laser write-in device 2 effects image exposure on the photosensitive drum 3 with the laser spot in accordance with the image data.

The electrostatic latent image formed by the image exposure is developed under an electric field in which at least one of the amplitude and period of the a.c. component is increased by the input of the control signal C to the bias power source 11 in the case of a line image. In the case of a tonal image, the latent image is developed under the electric field in which at least one of the amplitude and period of the a.c. component is made small. Thereafter, the recording operations are carried out in the same way as described already with reference to FIG. 1.

The recorded image obtained by this image reproducing apparatus has high resolution and sharpness in the case of a line image, and has intermediate tone and smoothness in the case of a tonal image.

Besides the image reproducing apparatus shown in FIG. 7 in which only the developing bias is changed over depending upon whether the image is a line image or a tonal image, it is possible to employ a conversion system to a binary image or a change-over system of the laser spot diameter for the present invention.

Figure 8:
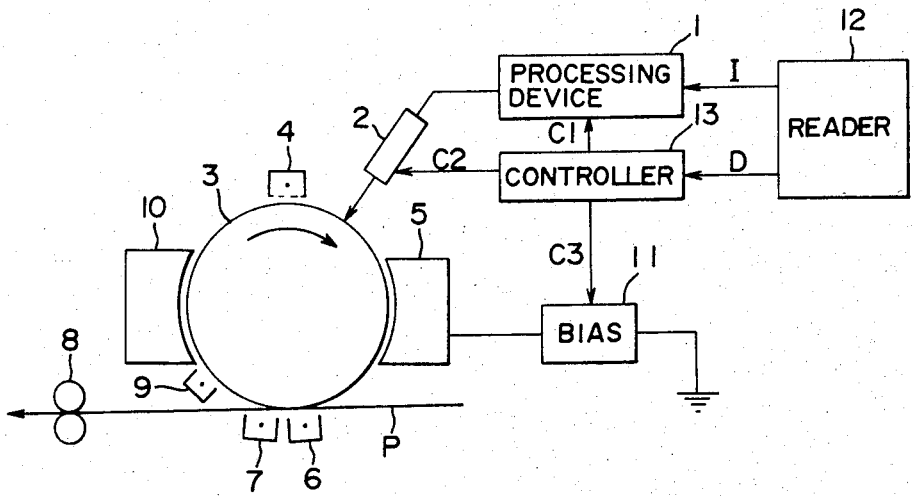

FIG. 8 illustrates an example of such apparatuses. The apparatus shown in FIG. 8 is different from the apparatus shown in FIG. 7 in that control signals C1, C2 and C3 are applied to the signal processing device 1, the laser write-in device 2 and the bias power source 11 from the controller 13, respectively. The signal processing system, the laser spot diameter and the developing bias are changed as shown in Table 1 on the basis of these control signals, and the image formation is conducted. However, the developing step is carried out as reversion development in which the toner is deposited on the regions to which the light is radiated.

TABLE 1

| original image | line image | tonal image | dot image |
| --- | --- | --- | --- |
| signal processing system | pure binary method | dither method | pure binary method |
| laser spot diameter | large | small | small |
| developing bias | $V_{ac}$: great f: small | $V_{ac}$: small f: great | $V_{ac}$: small f: great |

[Embodiments]

Hereinafter, preferred embodiments of the present invention will be described more definitely.

Embodiment 1:

In the image reproducing apparatus shown in FIG. 7, the discrimination signal D designated by the judgement of the operator as to whether the image was a line image or a tonal image was applied to the controller 13, and the controller 13 applied the control signal C to the bias power source 11. The signal processing unit 1 converted the image data I by the pure binary method, and the bias power source 11 applied the bias voltage shown in Table 2.

TABLE 2

| | | bias voltage | |
| --- | --- | --- | --- |
| | | | a.c. component |
| No. | kind of image | d.c. component (V) | amplitude (kV) | frequency (kHz) |
| 1 | line image | 80 | 1.5 | 2.0 |
| | tonal image | 80 | 1.0 | 2.0 |
| 2 | line image | 50 | 1.0 | 1.5 |
| | tonal image | 50 | 1.0 | 2.0 |

NOTE:
The amplitude is half of peak-to-peak.

The photosensitive drum 3 had a Se photosensitive layer on its surface and a diameter of 120 mm. The peripheral speed of its rotation in the direction indicated by an arrow was 120 mm/sec, and the drum 3 was electrically charged to 600 V by the charger 4. The laser write-in device 2 used He-Ne laser as the light source, and the sound-optical modulator modulated the laser light in accordance with the signals from the signal processing unit 1 so as to effect spot exposure on the charged surface of the photosensitive drum 3 at a density of 12 dots/mm. In the developing device 5, the diameter of the developing sleeve 51 was 30 mm, and the gap between the sleeve and the photosensitive drum 3 was 0.7 mm. The sleeve rotated leftward at a peripheral speed of 120 mm/sec during development while the magnet 52 rotated rightward at a peripheral speed of 800 rpm, so that a 0.5 mm thick layer of a two-component system developer consisting of a mixture of a nonmagnetic toner frictionally charged negative and a magnetic carrier was formed on the surface of the developing sleeve 51. Using this developing device 5, development was conducted by depositing the toner on the unexposed region of the photosensitive drum 3.

When reproduction of a line image and a tonal image was carried out using the image reproducing apparatus described above, the gaps between dots and concavo-convexity were not remarkable in the resulting reproduced images in the case of the line image for both Nos. 1 and 2, but were sufficiently sharp, and reproducibility was high for the intermediate tone for the tonal images.

Embodiment 2:

In an image reproducing apparatus shown in FIG. 8, the image reader 12 discriminate whether the original was a line image or a tonal image or a dot image, and the controller 13 applied the control signals C1 and C3 to the signal processing device 1 and the bias power source 11, respectively, on the basis of the discrimination signal D of the reader 12. The signal processing device 1 formed a binary image by the pure binary method when the original was a line image or the dot image, and by the dither method when the original was a tonal image. The bias power source 11 applied the bias voltages tabulated in Table 3 in accordance with the control signal C to the sleeve. The other conditions were the same as those in the first embodiment.

TABLE 3

| | | bias voltage | |
| --- | --- | --- | --- |
| | | | a.c. component |
| No. | kind of image | d.c. component (V) | amplitude (kV) | frequency (kHz) |
| 1 | line image | 100 | 2.0 | 3.0 |
| | tonal image | 100 | 1.5 | 3.0 |
| 2 | line image | 100 | 1.0 | 2.0 |
| | tonal image | 100 | 1.0 | 3.0 |

NOTE:
The amplitude is half of peak-to-peak.

The resulting reproduced image was sharp without any remarkable gaps between dots and concavo-convexity for the line image in either case of Nos. 1 and 2, and exhibited excellent reproducibility of intermediate tone and was smooth for the tonal image and the screen image.

Embodiment 3:

In an image reproducing apparatus shown in FIG. 8, the image reader 12 produced video signals as the image data I, and the controller 13 applied the control signals C2 and C3 to the laser write-in device 2 and the bias power source 11 upon receiving the discrimination signal D. The laser write-in device 2 selected a suitable lens in accordance with the control signal C2. When a line image was designated, it effected exposure using a laser spot of a 100 μm diameter, and when a tonal image was designated, the laser write-in device 2 effected exposure using a laser spot of a 70 μm diameter. The bias power source 11 applied the bias voltage tabulated in Table 4.

TABLE 4

| No. | kind of image | bias voltage | | |
|---|---|---|---|---|
| | | d.c. component (V) | a.c. component amplitude (kV) | a.c. component frequency (kHz) |
| 1 | line image | 500 | 2.0 | 2.0 |
| | tonal image | 500 | 1.5 | 2.0 |
| 2 | line image | 550 | 1.0 | 1.0 |
| | tonal image | 550 | 0.8 | 1.5 |

NOTE:
The amplitude is half of peak-to-peak.

The signal processing device 1 converted the image data I by the dither method regardless of the kind of the original, i.e., a line image or a tonal image. A developer of the type in which the toner was frictionally charged to positive was used for the developing device 5, and the gap between the developing sleeve 51 of the developing device 5 and the photosensitive drum 3 was controlled to 0.5 mm with the thickness of the developer layer being limited to 0.6 mm. So-called "reversion development" was conducted so that the toner was deposited on the exposed regions of the photosensitive drum 3. The other conditions were the same as those in the first embodiment.

When reproduction of a line image and a tonal image was carried out using the image reproducing apparatus described above, the resulting reproduced image was free from any remarkable gaps between dots and concavo-convexity of lines for the line image in either case of Nos. 1 and 2, and exhibited excellent reproducibility of the intermediate tone for the tonal image.

Embodiment 4:

In an image reproducing apparatus shown in FIG. 8, the signal processing device 1 formed a binary image by the systematic dither method when the original was a tonal image and by the pure binary method when the original was a line image or a screen image.

The laser write-in device 2 effected exposure by a laser spot having an 80 μm diameter for a line image and a laser spot having a 95 μm diameter for a tonal image and a screen image by lens exchange.

Since the toner was attached to the unexposed areas in development, the dots constituting the reproduced image were great in the case of a line image and were small in the case of a tonal image and a dot image. The bias power source 11 applied the bias voltage shown in Table 2 in accordance with the control signal C3.

Reproduction of the line image, the tonal image and the dot image was carried out by the image reproducing apparatus described above with the conditions for the photosensitive drum 3, the laser write-in device 2 and the developing device 5 being the same as those in the first embodiment. The resulting reproduced image was free from any remarkable gaps between dots and concavity or convexity of lines for a line image and was sharp for a line image, and exhibited excellent reproducibility of intermediate tone and was smooth for a tonal image and a dot image.

Embodiment 5:

An image reproducing apparatus shown in FIG. 8 was employed.

The kind of the original (line image or tonal image) was designated by the operator of the apparatus, and this designation was applied as the discrimination signal D to the controller 13.

The controller 13 produced control signals C1, C2 and C3. The conditions for the signal processing device 1, the laser write-in device 2 and the developing device 5 were the same as those in the third embodiment, and the bias power source 11, which was controlled by the control signal C3, applied the bias voltage shown in Table 4 to the developing sleeve 51 during development. The other conditions were the same as those in the fourth embodiment.

When reproduction of the line image and the tonal image was carried out using the image reproducing apparatus described above, the resulting reproducing images were equivalent, or superior, to the line image and the tonal image of the first embodiment in either case of Nos. 1 and 2.

Hereinafter, still another embodiment of the present invention will be described.

Figure 9:
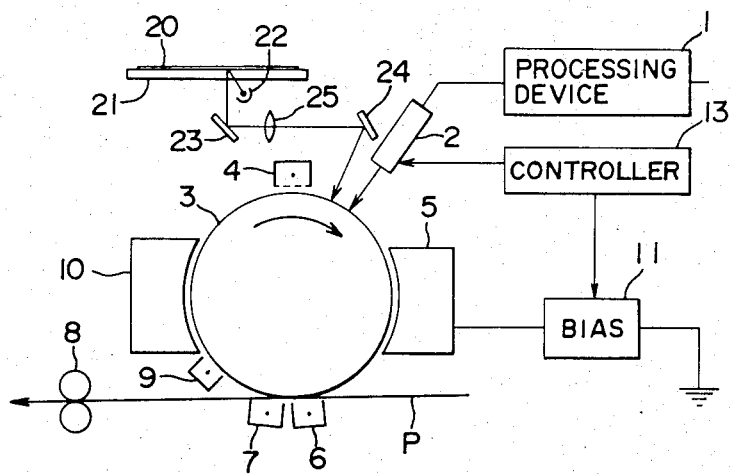
FIGS. 9 through 11 are side views of an image reproducing apparatus in accordance with another embodiments of the present invention.
Figure 10:
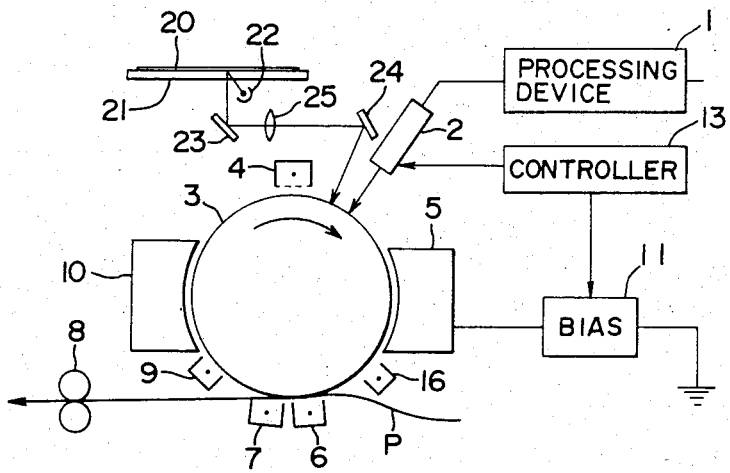
Figure 11:
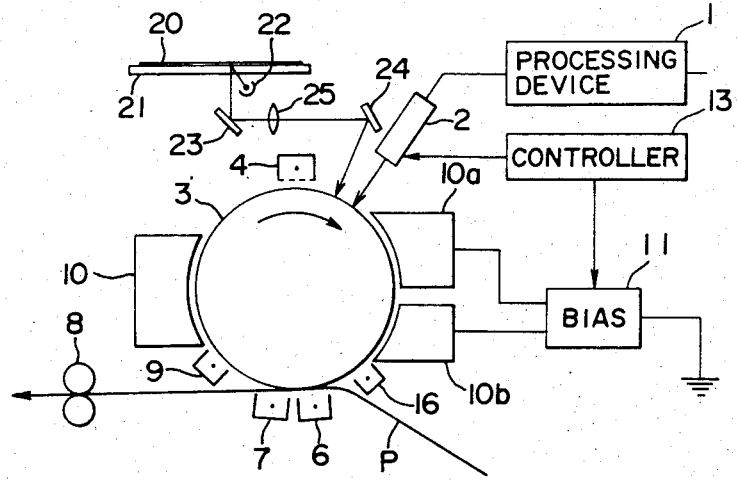

Each of the image reproducing apparatuses shown in FIGS. 9 through 11 is equipped with a slit exposure device for scanning and projecting an original 20 on an original table 21, consisting of an exposure lamp 22, mirrors 23, 24 and a lens 25, and with a laser spot exposure device consisting of an image processing device 1 for producing image signals, and a laser write-in device 2 which includes a laser, a sound-optical convertor, a rotary polygon mirror and the like, and which radiates laser light as a spot distribution on the basis of the output signals from the image processing device 1. As an image retainer rotates in the direction indicated by arrow, the surface consisting of a photosensitive layer is uniformly charged by a charger 4, and exposure is made on the charged surface by either the slit exposure device or the laser spot exposure device, thereby forming an electrostatic latent image.

Figure 12:
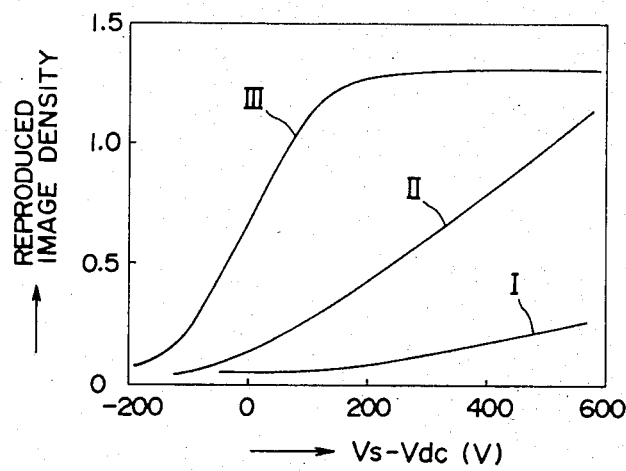
FIG. 12 is a diagram showing the change of developing characteristics when the amplitude of the a.c. component of a bias voltage is changed.

In the image reproducing apparatus shown in FIGS. 9 and 10, the electrostatic latent image formed on the surface of the image retainer 3 is developed to a toner image in an electric field by a developer 5, details of which are shown in FIG. 12, and the toner image is transferred to a recording paper P that is being fed in synchronism with the rotation of the image retainer 3 in such a manner as to come into contact with the surface of the image retainer 3 by a transfer device 6. After the toner image is thus transferred, the recording paper P is separated from the surface of the image retainer 3 by a separation means 7, and the toner image is fixed by a heat roller fixing device 8. Thereafter, the recording paper P is discharged outside the reproducing apparatus. The charge is eliminated by a charge elimination means 9 from the surface of the image retainer 3 after the transfer of the toner image, and the residual toner is removed by a cleaning device 10, followed then by the repetition of the next image forming step.

The image reproducing apparatus shown in FIG. 10 is different from that shown in FIG. 9 in that it is equipped with a transfer pre-charger 16 between the developing device 5 and the transfer device 6 in order to facilitate the transfer of the toner image to the recording paper P.

Both of the image reproducing apparatuses shown in FIGS. 9 and 10 can develop an electrostatic latent image formed by both of the exposure devices described above in the toner image of the same color, if the developer of the developing device 5 contains one kind of toner. When a developer consisting of a mixture of two kinds of toners having charge characteristics which are divided into positive and negative and which have two different colors, is used, however, the apparatuses can obtain separately reproduced images having different colors by, for example, developing normally the electrostatic latent image formed by the slit exposure device by use of one of the toners, and by reversion-developing the electrostatic latent image formed by the laser spot exposure device by the other toner.

Moreover, these apparatuses can reproduce a two-color image by superposing the toner images of different colors on the image retainer 3. This superposition of toner images is carried out by first forming a toner image of one of the colors and then forming and developing again an electrostatic latent image on the surface of the same image retainer by the other exposure device without transferring the first toner image of one color to the recording paper P, that is, without operating the transfer pre-charger 16, the transfer device 6, the separation means 7 and the cleaning device 10. In this case, the charge elimination means 9, too, may be kept inoperative. When the charge elimination means 9 is kept inoperative, charge by the charger 4 may be omitted and an electrostatic latent image can be formed superposedly by the slit exposure device provided that the first electrostatic latent image is formed by the laser spot exposure device.

The image reproducing apparatus shown in FIG. 11 is equipped with a developing device which is equivalent to that shown in FIG. 2. This apparatus is different from the one shown in FIG. 10 in that the electrostatic latent image formed by the slit exposure device, for example, is developed by a developing device 10a and the electrostatic latent image formed by the laser spot exposure device, for example, is developed by a developing device 10b. The developing devices 10a and 10b may use toners having different colors from each other. In this case, superposition of the toner images can be made in the same way as described above. Moreover, the image reproducing apparatus shown in FIG. 11 can obtain a 4-color reproduced image by using a developer consisting of a mixture of two different color toners having different charge characteristics in the same way as for the developing device 5 of the image reproducing apparatus as shown in FIGS. 9 and 10, for both of the developing devices 10a and 10b, so that the electrostatic latent image formed by any of the exposure devices can be developed in the toner image having a different color by such a developer.

In the image reproducing apparatuses described above, the present invention changes the bias voltage by changing the output of the bias power source 11 by means of the controller 13 of the reproducing apparatus including a central processing unit CPU or a microcomputer consisting of memories ROM and RAM, an input/output device I/O and the like, between the case where the developing device 5 or 10a or 10b develops an electrostatic latent image formed by the slit exposure device and the case where the developing device develops the electrostatic latent image formed by the laser spot exposure device. In other words, the controller 13 controls the bias power source 11 in the electric field such that an image having excellent tone can be obtained when the electrostatic latent image formed by the slit exposure device is developed in the electric field such that an image having high contrast can be obtained when the latent image formed by the laser spot exposure device is developed. Therefore, the best image can be reproduced in accordance with the kind of latent image and an excellent reproduced image of the respective latent image or its superposed image can be obtained.

This point will be described in further detail with reference to FIGS. 12 and 13.

The bias voltage to be applied to the developing sleeve 51 by the bias power source 11 during development generally includes a d.c. component for preventing fog arising from the deposition of the toner to the non-image portion of the image retainer 3 or for adjusting developing density, and an a.c. component influencing developing density and tone. If this bias voltage is changed, the developing characteristics change with respect to the same surface potential $V_s$ of the image retainer 3 as shown in FIGS. 12 and 13.

Figure 13:
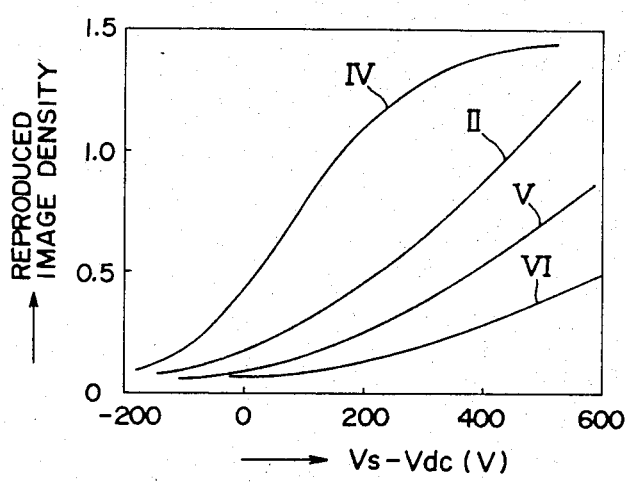
FIG. 13 is a diagram showing the change of developing characteristics when the frequency of the a.c. component of a bias voltage is changed.

FIGS. 12 and 13 show the result of experiments under the following conditions. The image retainer 3 had a Se photosensitive layer on its surface, and a diameter of 120 mm. It rotated at a peripheral speed of 120 mm/sec in the direction indicated by arrow, and was charged to +600 V by the charger 4. The electrostatic latent image having a surface potential $V_s$ was formed on the charged surface by the slit exposure device. A two-component developer consisting of a non-magnetic toner and a magnetic carrier was used for the developing device 5, and the toner was charged negative by friction with the carrier.

The developing device 5 was set so that the surface gap between the developing sleeve 51 having a 30 mm diameter and the image retainer 3 was 0.7 mm or 700 μm, and the developing sleeve 51 was rotated leftward at a peripheral speed of 120 mm/sec with the magnet 52 being rotated rightward at a peripheral speed of 600 rpm. As a result, a 0.5 mm thick developer layer was formed on the surface of the developing sleeve 51, thereby developing the electrostatic latent image having the surface potential $V_s$. The abscissa in FIGS. 12 and 13 represents the difference between the surface potential $V_s$ and the d.c. component $V_{dc}$ of the bias voltage, and the ordinate represents the density of the reproduced image, that is, the developing density. Reference numerals I, II and III in FIG. 12 represent the density curves when the amplitude, that is, the width from the center value to the peak, was changed to 0 kV, 1 kV and 2 kV, respectively, with the frequency of the a.c. component of the bias voltage being 1 kHz. Reference numerals IV, V and VI represent the density curves when the frequency was changed to 700 Hz, 2 kHz and 4 kHz with the amplitude of the a.c. component of the bias voltage being 1 kV.

As can be seen clearly from FIG. 12, high image density can be obtained by increasing the amplitude of the a.c. component of the bias voltage, but the tone becomes hard as γ becomes great. If the amplitude is reduced, conversely, the image density is reduced, but the tone becomes excellent as γ becomes small. As can be seen clearly from FIG. 13, if the frequency of the a.c. component of the bias voltage is reduced, high density of the image can be obtained, but γ tends to increase for the tone.

Conversely, if the frequency is increased, the image density is reduced, but reproducibility is better because γ is small for the tone.

The inventors of the present invention came to the conclusion from experimental results described above that a developing condition in which the amplitude of the a.c. component of the bias voltage is reduced, or the frequency is increased, or in which both of them are employed, is suitable for the development of a latent image having a continuous tone such as an electrostatic latent image formed by the slit exposure device because reproducibility of the tone is excellent, and a developing condition in which the amplitude and the frequency are inversely changed to the above is suitable for the development of a latent image having a binary tone such as an electrostatic latent image formed by a laser spot exposure device. The present invention was completed on the basis of this conclusion.

If an electrostatic latent image is formed by the slit exposure device in the image reproducing apparatus of the present invention shown in FIGS. 9 through 11, the controller 13 controls the bias power source 11 so that a bias voltage having an a.c. component satisfying a small amplitude or a great frequency, or both, is applied to the developing sleeve 51, and if the electrostatic latent image is formed by the laser spot exposure device, the controller 13 actuates the laser write-in device 2 and at the same time, controls the bias power source 11 so that a bias voltage having an a.c. component satisfying the conditions opposite to the above is applied to the developing sleeve 51. Therefore, the image reproducing apparatus of the present invention can easily obtain a reproduced image having the best reproducibility to match the type of latent image.

In the image reproducing apparatus of the present invention, it is preferable to use a two-component system developer consisting of a mixture of a toner and a carrier that have been described with reference to FIGS. 12 and 13 for the developing devices 5, 10a and 10b. However, a one-component developer consisting of a toner alone can also be used. Though it is preferable to employ a non-contact developing condition in which the developer layer on the developing sleeve 51 is not brought into contact with the surface of the image retainer 3, the invention is not particularly limited to this method. The present invention can be applied not only to the case where the latent image forming means of continuous tone relies upon transmission light but also to the case where it relies upon flash exposure. The present invention can also be applied to the case where forming means of a latent image having a dispersed tone is such that charge is injected by a multistylus electrode or the like so as to directly form the latent image.

Next, still another embodiment of the present invention will be described.
Embodiment 6:

An image reproducing apparatus shown in FIG. 9 was used. The forming condition of the developer layer in the image retainer 3 and the developing sleeve 51 of the developing device 5 of this reproducing apparatus was the same as those described with reference to FIGS. 12 and 13 except for the following, and the laser write-in device 2 received the image signals from the image processing device 1 by means of the control signals from the controller 13 and radiated the laser light from a He-Ne laser in a spot density of 12 dots/mm through the sound-optical convertor and the rotary polygon mirror, thereby forming the electrostatic latent image.

The electrostatic latent images formed by the slit exposure device and by the laser spot exposure device, were developed by applying the bias voltages shown in Table 5 to the developing sleeve 51 of the developing device 5, and were then transferred and fixed to the recording paper P.

TABLE 5

| No. | kind of exposure | bias voltage d.c. component (V) | a.c. component amplitude (kV) | a.c. component frequency (kHz) |
|---|---|---|---|---|
| 1 | slit | 100 | 1 | 1 |
|   | laser spot | 200 | 2 | 1 |
| 2 | slit | 0 | 1 | 2 |
|   | laser spot | 150 | 1 | 0.7 |
| 3 | slit | 50 | 1 | 1 |
|   | laser spot | 150 | 1.5 | 0.8 |

The resulting images had high tone when slit exposure was used, for all of the cases Nos. 1 through 3 of Table 5, and were line images having sufficient density and free of any remarkable line breakage and line steps when laser spot exposure was used.
Embodiment 7:

An image reproducing apparatus shown in FIG. 10 was used. A developer consisting of a mixture of a black toner, which was charged frictionally to negative, and a red toner, which was charged frictionally to positive, with a magnetic carrier was used for the developing device 5, but the conditions for forming the latent image for the image retainer 3 and the developing sleeve 51 of the developing device 5 were the same as those in the first embodiment. First of all, the electrostatic latent image formed by the slit exposure was normally developed to a black toner image, and only the charge was eliminated by the charge elimination means 9 without carrying out transfer and cleaning. Then, the surface of the image retainer 3 was again charged to 600 V by the charger 4, and an electrostatic latent image was formed by laser spot exposure and was developed by reversion development in a red toner image in order to obtain a superposed image. The superposed image was charged negative by the transfer pre-charger 16 and was then transferred to the recording paper and was fixed. The bias voltages for these two developments were shown in Table 6.

TABLE 6

| No. | kind of exposure | bias voltage d.c. component (V) | a.c. component amplitude (kV) | a.c. component frequency (kHz) |
|---|---|---|---|---|
| 1 | slit | 100 | 1 | 1 |
|   | laser spot | 400 | 2 | 1 |
| 2 | slit | 0 | 1 | 2 |
|   | laser spot | 450 | 1 | 0.7 |
| 3 | slit | 50 | 1 | 1 |
|   | laser spot | 450 | 1.5 | 0.8 |

In the two-color images reproduced under the conditions described above, the original 20 was reproduced by black toner with high tone for all of the cases Nos. 1-3, and the output image data of the image prcessing device 1 was superposed by red toner as the line images having sufficient density and free from any remarkable breakage and steps, providing clear and sharp two-color images without any color mixture.

Though the red toner charged positive was used in combination with the black toner charged negative in this embodiment, the combination of colors can be arbitrarily selected, and the same color may be of course be used. The developer need not contain the magnetic carrier in the same way as in the sixth embodiment. If at least one of the two kinds of toners contains a magnetic substance in this embodiment, the occurrence of fog can be prevented. In this embodiment, the sequence of development may be reversed, but in order to effectively prevent the color mixture, it is preferable to effect reversion development later.

Embodiment 8:

An image reproducing apparatus shown in FIG. 11 was used.

A developer consisting of a mixture of a magnetic carrier and a black toner charged frictionally to negative was used for developing device 10a, and a developer consisting of a mixture of the same magnetic carrier and a red toner charged frictionally to positive was used for developing device 10b. The difference between this embodiment and the seventh embodiment was that the image retainer 3 was charged to 400 V by the charger 4 when both latent images were formed by both exposure devices, and the latent image formed by slit exposure was developed by developing device 10a while the latent image formed by the laser spot exposure was developed by developing device 10b, with the bias voltages shown in Table 7 being applied, during development. The rest of conditions were the same as those employed in the second embodiment.

TABLE 7

| | | bias voltage | | |
| | | | a.c. component | |
| No. | kind of exposure | d.c. component (V) | amplitude (kV) | frequency (kHz) |
| --- | --- | --- | --- | --- |
| 1 | slit | 100 | 1 | 1 |
| | laser spot | 400 | 1.5 | 1 |
| 2 | slit | 0 | 1.2 | 2 |
| | laser spot | 450 | 1.2 | 1 |
| 3 | slit | 50 | 1 | 1 |
| | laser spot | 450 | 1.5 | 0.8 |

Formation and reproduction of two-color images were carried out under the conditions described above, and clear two-color images free from any color mixture and equivalent, or superior, to those obtained in the seventh embodiment could be obtained.

In this embodiment, too, the combination of colors and the sequence of formation of the toner images are arbitrary in the same way as in the seventh embodiment, but when normal development and reversion development are conducted, it is more effective to effect reversion development later in order to prevent the mixture of colors. In this embodiment, it is possible to carry out the second reversion development by normal development using a negative charged toner. In this embodiment and embodiments 6 and 7, the developer layer on the developing sleeve 51 is not brought into contact with the surface of the image retainer 3, but a condition in which they are brought into contact can also be employed. However, the non-contact condition is preferable in order to prevent the disturbance of the toner image that has been first formed or to prevent the mixture of different color toners into developing devices 10a, 10b of this embodiment.

The image reproducing apparatus of the present invention can provide a reproduced image having high resolution and sharpness when the original is a line image, and a reproduced image of a dot composition having high reproducibility of intemediate tone and high smoothness when the original is a tonal image.

The present invention can be applied not only to an image reproducing apparatus which effects laser write-in to an electrophotographic photo-sensitive member but also to an image reproducing apparatus which forms an image constituted by dots using an electrostatic reproducing system or a magnetic reproducing system.

The image reproducing apparatus in accordance with the present invention can always reproduce the best reproduced image to match the type of latent image, and can easily provide an excellent reproduced image of the respective latent image or its superposed image.

What is claimed is:

1. In an image reproducing apparatus of the type which includes a plurality of latent image forming means and which develops a latent image formed by said latent image forming means on an image retainer by developing means in which a developing bias is applied, the improvement comprising means to provide a developing bias having an oscillating component and for applying said component in accordance with the difference between latent images formed by said plurality of latent image forming means.

2. The image reproducing apparatus as defined in claim 1 wherein one of said latent image forming means is a continuous tone latent image forming means and another is a dispersed tone latent image forming means.

3. The image reproducing apparatus as defined in claim 2 wherein said means to provide a developing bias having an oscillating component sets a smaller field amplitude for a latent image formed by said continuous tone latent image forming means than for a latent image formed by said dispersed tone latent image forming means.

4. The image reproducing apparatus as defined in claim 2 wherein said means to provide a developing bias having an oscillating component sets a higher frequency for a latent image formed by said continuous tone latent image forming means than for a latent image formed by said dispersed tone latent image forming means.

5. The image reproducing apparatus as defined in claim 1 wherein said means to provide said developing bias comprises means for changing said electric field in accordance with the kind of image data provided by said plurality of latent image forming means.

6. The image forming apparatus as defined in claim 1 wherein said means to provide said developing bias operates to apply a different developing bias in accordance with different images formed by said plurality of latent image forming means.

7. The image forming apparatus as defined in claim 1 wherein said means to provide said developing bias can be varied in accordance with different images formed by said plurality of latent image forming means.

8. In an image reproducing apparatus of the type which includes means for forming dispersedly a latent image on an image retainer on the basis of image signals obtained in response to image data, and developing means, including biasing means, for developing said latent image under a developing bias, the improvement wherein said biasing means provides a developing bias which has an oscillating component and wherein said means for forming said latent image changes the size of the latent image units when forming said latent images, in accordance with the kind of said image data.

9. The image reproducing apparatus as defined in claim 8 wherein said image retainer has a photoconductive layer, said means for forming said latent image comprises means for radiating a light beam as a spot, and the spot diameter can be changed in accordance with the kind of images.

10. The image reproducing apparatus as defined in claim 8 wherein said means for forming said latent image obtains image signals by signal processing of said image data, and effects changes in signal processing in accordance with the kind of said image data.

11. The image reproducing apparatus as defined in claim 10 wherein said signal processing includes a pure binary method which converts the image signal to a binary value by setting a common threshold value for each picture element of the image signal, and a dither method which effects said binary conversion by setting a different threshold value for each picture element.

12. In an image reproducing apparatus of the type which includes means for dispersedly forming a latent image on an image retainer on the basis of image signals obtained in response to image data, and means for developing said latent image under a developing bias, the improvement wherein said biasing means provides a developing bias which has an oscillating component and can be changed in accordance with the kind of said image data.

13. The image reproducing apparatus as defined in claim 12 wherein said developing bias contains an oscillating component, and the amplitude of said oscillating component is increased or the frequence thereof is reduced when an image is a line image and the amplitude of said oscillating component is reduced or the frequence thereof is increased when the image is a tonal image.

14. An image forming apparatus comprising:
means for forming a continuous tone latent image;
means for forming a dispersed tone latent image;
an image retainer;
and developing means including biasing means;
wherein a first latent image is formed on said image retainer by one of said latent image forming means, wherein said first latent image is developed by said developing means while said biasing means provides an oscillating component under a predetermined developing condition, wherein a second latent image is formed on said image retainer by the other of said latent image forming means to superpose a toner image, wherein said second latent image is developed by said developing means under a predetermined developing condition, and wherein said biasing means applies a different developing bias on said developing means in accordance with differences between images from said latent image forming means.

15. The image forming apparatus as defined in claim 14 wherein the developing bias applied on said developing means can be varied in accordance with said differences.

* * * * *